United States Patent
Miao et al.

(10) Patent No.: US 10,187,847 B2
(45) Date of Patent: Jan. 22, 2019

(54) METHOD AND DEVICE FOR PERFORMING CAMPING

(71) Applicant: Telefonaktiebolaget LM Ericsson (publ), Stockholm (SE)

(72) Inventors: Qingyu Miao, Beijing (CN); Rui Fan, Beijing (CN); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 174 days.

(21) Appl. No.: 15/034,535

(22) PCT Filed: Apr. 27, 2016

(86) PCT No.: PCT/CN2016/080335
§ 371 (c)(1),
(2) Date: May 4, 2016

(87) PCT Pub. No.: WO2017/185252
PCT Pub. Date: Nov. 2, 2017

(65) Prior Publication Data
US 2018/0092028 A1 Mar. 29, 2018

(51) Int. Cl.
*H04W 8/08* (2009.01)
*H04W 48/12* (2009.01)
(Continued)

(52) U.S. Cl.
CPC ............ *H04W 48/12* (2013.01); *H04W 8/08* (2013.01); *H04W 48/18* (2013.01);
(Continued)

(58) Field of Classification Search
CPC ..... H04M 3/56; H04M 7/1295; H04W 36/22; H04W 28/0221; H04W 36/0027;
(Continued)

(56) References Cited

U.S. PATENT DOCUMENTS

2012/0302241 A1 11/2012 Klingenbrunn et al.
2012/0309397 A1 12/2012 Rao et al.
(Continued)

FOREIGN PATENT DOCUMENTS

| CN | 104969615 A | 10/2015 |
|----|-------------|---------|
| CN | 105101345 A | 11/2015 |
| WO | 2015038049 A1 | 3/2015 |

OTHER PUBLICATIONS

International Search Report and Written opinion for Application No. PCT/CN2016/080335, dated Jan. 20, 2017, 8 pages.
(Continued)

*Primary Examiner* — Kwasi Karikari
(74) *Attorney, Agent, or Firm* — Nicholson De Vos Webster & Elliott LLP

(57) ABSTRACT

Embodiments of the disclosure generally relate to performing camping in a wireless communication network. A device in the wireless communication network obtains an operation state of a mobile terminal. Based on the operation state, the device determines a target camping mode from a single camping mode and a multiple camping mode. The single camping mode indicates that a single RAT is used for camping, and the multiple camping mode indicates that a primary RAT and a secondary RAT are used for camping. Then, the device configures the mobile terminal based on the target camping mode. In this way, the possibility that a mobile terminal accesses to a better RAT is increased.

19 Claims, 4 Drawing Sheets

(51) Int. Cl.
*H04W 48/18* (2009.01)
*H04W 76/10* (2018.01)
*H04W 68/00* (2009.01)
*H04W 88/06* (2009.01)
*H04W 48/16* (2009.01)

(52) U.S. Cl.
CPC ......... *H04W 68/005* (2013.01); *H04W 76/10* (2018.02); *H04W 48/16* (2013.01); *H04W 88/06* (2013.01)

(58) Field of Classification Search
CPC ..... H04W 36/14; H04W 36/18; H04W 88/06; H04W 24/02; H04W 52/146; H04W 28/10; H04W 36/0061; H04W 36/0083; H04W 36/06
See application file for complete search history.

(56) References Cited

U.S. PATENT DOCUMENTS

| | | |
|---|---|---|
| 2014/0080459 A1 | 3/2014 | Taha et al. |
| 2014/0200046 A1* | 7/2014 | Sikri ............... H04W 52/38 455/552.1 |
| 2014/0220981 A1 | 8/2014 | Jheng et al. |
| 2015/0079986 A1 | 3/2015 | Nayak et al. |
| 2016/0021660 A1 | 1/2016 | Krishnamurthy et al. |
| 2016/0219475 A1* | 7/2016 | Kim ............... H04W 76/025 |

OTHER PUBLICATIONS

Xing P., et al., "Multi-RAT Network Architecture," OUTLOOK Visions and research directions for the Wireless World, Nov. 30, 2013, No. 9, 26 pages.

Extended European Search Report for Application No. 16847577.0, dated Mar. 13, 2018, 7 pages.

International Preliminary Report on Patentability for Application No. PCT/CN2016/080335, dated Nov. 8, 2018, 5 pages.

* cited by examiner

METHOD AND DEVICE FOR PERFORMING CAMPING

CROSS-REFERENCE TO RELATED APPLICATIONS

This application is a National stage of International Application No. PCT/CN2016/080335, filed Apr. 27, 2016, which is hereby incorporated by reference.

TECHNICAL FIELD

Embodiments of the present disclosure generally relate to the field of communications, and more particularly, to a method and device for performing camping.

BACKGROUND

The development trend of wireless communication networks is that many kinds of coexisting radio access technologies (RATs) for users. By way of example, a communication network (for example, a Next Radio (NR) system) may be operated tightly with another communication network (for example, a long-term evolution (LTE) system), and tight inter-operation between RATs of the two systems may be widely used. In some cases, the LTE system may help the NR system to broadcast system information since the LTE system is operated in a lower frequency with better coverage.

In the LTE system, a mobile terminal (also referred to as "user equipment (UE)") camps in a "cell". Prior to camping, the UE performs a cell selection based on measurements. Then, the UE tunes to a control channel of the cell when performing camping. In particular, camping enables the UE to receive system information from Public Land Mobile Network (PLMN). When registered and if the UE wishes to establish a radio resource control (RRC) connection, it can do this by initially accessing the network on the control channel of the cell on which it is camped. On the other hand, if the PLMN receives a call for the registered UE, it may know the set of tracking areas in which the UE is camped. Then the PLMN may send a "paging" message for the UE on control channels of all the cells in this set of tracking areas. The UE will then receive the paging message because it has tuned to the control channel of a cell in one of the registered tracking areas and the UE may respond using a corresponding control channel.

In the NR system, which is also referred to as Next Generation (NX) system for purpose of discussion, different nodes may transmit different information. For instance, some nodes may transmit System Signature Index (SSI) and/or Access Information Table (AIT), while others may not transmit the SSI/AIT. Similarly, some nodes may transmit Track Area Signals (TRASs) while others may transmit paging messages. As such, the cell camping in LTE may be not suitable for NX. For instance, the conventional camping mode which is statistic is not applicable.

SUMMARY

In general, embodiments of the present disclosure provide a solution for performing camping in a wireless communication network.

In a first aspect, a method implemented by a device in a wireless communication network is provided. A device in the wireless communication network obtains an operation state of a mobile terminal. Based on the operation state, the device determines a target camping mode from a single camping mode and a multiple camping mode for the mobile terminal. The single camping mode indicates that a single RAT is used for camping, and the multiple camping mode indicates that multiple RATs are used for camping. Then, the device configures the mobile terminal based on the target camping mode. The corresponding computer program is also provided. The device may be the mobile terminal, a node serving the mobile terminal, or other suitable device.

In one embodiment, obtaining the operation state may include obtaining at least one of: energy status of the mobile terminal; a Quality of Service (QoS) of the mobile terminal; an active time period or traffic amount of the mobile terminal; quality of a channel between the device and the mobile terminal; frequency of inter-RAT switching of the mobile terminal; and moving speed of the mobile terminal.

In one embodiment, obtaining the frequency of inter-RAT switching may include at least one of: obtaining the frequency of inter-RAT switching from a historical record of the inter-RAT switching; or determining a first coverage of a first node serving the mobile terminal and a second coverage of a second node in proximity of the first node, the first node being associated with a first RAT and the second node being associated with a second RAT, and determining the frequency of inter-RAT switching based on the first coverage and the second coverage.

In one embodiment, determining the target camping mode may include: in response to energy status of the mobile terminal being obtained, comparing the energy status with a threshold energy; in response to the energy status exceeding the threshold energy, determining the multiple camping mode as the target camping mode; and in response to the energy status being less than the threshold energy, determining the single camping mode as the target camping mode.

In one embodiment, determining the target camping mode may include: in response to a QoS of the mobile terminal being obtained, comparing the QoS with a threshold QoS; in response to the QoS exceeding the threshold QoS, determining the multiple camping mode as the target camping mode; and in response to the QoS being less than a threshold QoS, determining the single camping mode as the target camping mode.

In one embodiment, determining the target camping mode may include: in response to an active time period or traffic amount of the mobile terminal being obtained, comparing the active time period with a threshold time or comparing the traffic amount with a threshold amount; in response to the active time period exceeding the threshold time or the traffic amount exceeding the threshold amount, determining the multiple camping mode as the target camping mode; and in response to the active time period being less than the threshold time or the traffic amount being less than the threshold amount, determining the single camping mode as the target camping mode.

In one embodiment, determining the target camping mode may include: in response to quality of a channel between the device and the mobile terminal being obtained, comparing the quality with a threshold quality; in response to the quality exceeding the threshold quality, determining the multiple camping mode as the target camping mode; and in response to the quality being less than the threshold quality, determining the single camping mode as the target camping mode.

In one embodiment, determining the target camping mode may include: in response to frequency of inter-RAT switching of the mobile terminal being obtained, comparing the frequency with a threshold frequency; in response to the frequency exceeding the threshold frequency, determining the multiple camping mode as the target camping mode; and in response to the frequency being less than the threshold frequency, determining the single camping mode as the target camping mode.

In one embodiment, determining the target camping mode may include: in response to moving speed of the mobile terminal being obtained, comparing the moving speed comparing a speed threshold; in response to the moving speed being less than the speed threshold, determining the multiple camping mode as the target camping mode; and in response to the moving speed exceeding the speed threshold, determining the single camping mode as the target camping mode.

In one embodiment, configuring the mobile terminal may include: sending an indication of the target camping mode to the mobile terminal.

In a second aspect, a method implemented by a mobile terminal in a wireless communication network is provided. The mobile terminal receives an indication of a target camping mode. The target camping mode is determined from a single camping mode and a multiple camping mode based on an operation state of the mobile terminal. The single camping mode indicates that a single RAT is used in camping, and the multiple camping mode indicates that multiple RATs are used in camping. After that, the mobile terminal may perform camping according to the target camping mode. The corresponding computer program is also provided.

In one embodiment, performing camping according to the target camping mode may include: in response to the target camping mode being the multiple camping mode, determining channel qualities associated with the multiple RATs; selecting a target RAT from the multiple RATs based on the channel qualities; and sending camping status of the target RAT to a device communicating with the mobile terminal, to trigger the device to page the mobile terminal via the target RAT.

In one embodiment, the multiple RATs may include a primary RAT and a secondary RAT and performing camping according to the target camping mode may include: in response to the target camping mode being the multiple camping mode, determining a channel quality associated with the primary RAT; and in response to the channel quality being less than a primary quality threshold, sending camping status of the secondary RAT to a device communicating with the mobile terminal.

In one embodiment, the multiple RATs may include a primary RAT and a secondary RAT and performing camping according to the target camping mode may include: in response to the target camping mode being the multiple camping mode, determining a work load associated with the primary RAT; and in response to the work load exceeding a primary load threshold, sending camping status of the secondary RAT to a device communicating with the mobile terminal.

In one embodiment, the camping status of the secondary RAT may be sent during setup of radio connection via the primary RAT.

In one embodiment, the method may further include sending a camping indication to the device, the camping indication indicating whether the mobile terminal camps on the secondary RAT.

In a third aspect, a device in a wireless communication network is provided. The device includes an obtaining unit, a determining unit and a configuring unit. The obtaining unit is configured to obtain an operation state of a mobile terminal. The determining unit is configured to determine a target camping mode from a single camping mode and a multiple camping mode based on the operation state of the mobile terminal, the single camping mode indicating that a single RAT is used for camping, and the multiple camping mode indicating that multiple RATs are used for camping. The configuring unit is configured to configure the mobile terminal based on the target camping mode.

In a fourth aspect, a mobile terminal in a wireless communication network is provided. The mobile terminal includes a receiving unit and a performing unit. The receiving unit is configured to receive an indication of a target camping mode, the target camping mode being determined from a single camping mode and a multiple camping mode based on an operation state of the mobile terminal, the single camping mode indicating that a single RAT is used in camping, and the multiple camping mode indicating that multiple RATs are used in camping. The performing unit is configured to perform camping according to the target camping mode.

In a fifth aspect, a device in a wireless communication network is provided. The device includes: a processor and a memory, the memory containing instructions executable by the processor, whereby the processor being adapted to cause the device to: obtain an operation state of a mobile terminal; determine a target camping mode from a single camping mode and a multiple camping mode based on the operation state of the mobile terminal, the single camping mode indicating that a single RAT is used for camping, and the multiple camping mode indicating that multiple RATs are used for camping; and configure the mobile terminal based on the target camping mode.

In a sixth aspect, a mobile terminal in a wireless communication network is provided. The mobile terminal includes: a processor and a memory, the memory containing instructions executable by the processor, whereby the processor being adapted to cause the mobile terminal to: receive an indication of a target camping mode, the target camping mode being determined from a single camping mode and a multiple camping mode based on an operation state of the mobile terminal, the single camping mode indicating that a single RAT is used in camping, and the multiple camping mode indicating that multiple RATs are used in camping; and perform camping according to the target camping mode.

According to embodiments of the present disclosure, a suitable camping mode is determined based on the operation state of the mobile terminal. In this way, the mobile terminal can be configured with a suitable camping mode in a dynamic way.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
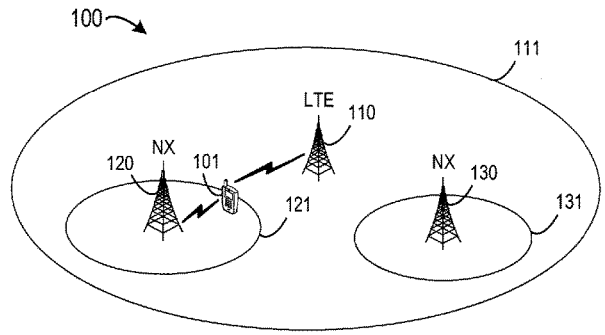
FIG. 1 shows an environment of a wireless communication network 100 in which embodiments of the present disclosure may be implemented.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable wireless communication standards, such as LTE-Advanced (LTE-A), LTE, Wideband Code Division Multiple Access (WCDMA), High-Speed Packet Access (HSPA), and so on. Furthermore, the communications between devices in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

As used herein, the term "device" refers to a device in a wireless communication network via which a mobile terminal accesses the network and receives services therefrom. By way of example, a network device or a terminal device. The network device may refer to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "mobile terminal" refers to any end device that can access a wireless communication network and receive services therefrom. By way of example and not limitation, a terminal device may be a user equipment (UE), which may be a Subscriber Station (SS), a Portable Subscriber Station, a Mobile Station (MS), or an Access Terminal (AT). The mobile terminal may include, but not limited to, a mobile phone, a cellular phone, a smart phone, a tablet, a wearable device, a personal digital assistant (PDA), and the like.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." The term "exceeding" is to be read as "being larger than or equal to." Other definitions, explicit and implicit, may be included below.

Now some exemplary embodiments of the present disclosure will be described below with reference to the figures. Reference is first made to FIG. 1, which illustrates an environment of a wireless communication network 100 in which embodiments of the present disclosure may be implemented. As shown in FIG. 1, the wireless communication network 100 includes a LTE system 111 and two NX systems 121 and 131. The LTE system 111 is managed by a LTE BS 110. One of the NX systems 121 is managed by a NX BS 120 and the other one 131 is managed by a BS 130. In the example of FIG. 1, a mobile terminal (also referred to as "UE" hereafter) 101 is in the coverage of both the LTE BS 110 and the NX BS 120. For instance, the mobile terminal 101 may camp in either or both of the LTE system 111 and the NX system 121, and may be paged by or access to either or both of the LTE system 111 and the NX system 121.

In the NX system, signals monitored by a mobile terminal in a dormant state for accessing or network paging may include SSI which is measured to facilitate the mobile terminal to access the network, TRAS which is measured and monitored so that the mobile terminal reports Track Area (TRA) in which it is located in, paging messages, and so on. In particular, the paging message may include paging indication channel/paging message channel (PICH/PMCH) which allows the system to distribute notification messages and contact the mobile terminal. NX camping is, therefore, related to reception of a set of signals. The mobile terminal should camp on the "best" SSI, TRAS, and PICH/PMCH. In the example of FIG. 1, SSI_A and PICH/PMCH_A are SSI and PICH/PMCH associated with the LTE system 111, SSI_C and PICH/PMCH_C are SSI and PICH/PMCH associated with the NX system 121, and SSI_B is the SSI associated with the NX system 131. In this example, the mobile terminal 101 may camp on: SSI_A, PICH/PMCH_A (if the network configured the mobile terminal to monitor it), and TRAS_C. When the mobile terminal 101 moves out of coverage area of the NX system 121, the mobile terminal 101 may start monitoring PICH/PMCH_C as it would be stronger.

The camping may be generally divided as single RAT camping and multiple RAT camping. The single camping mode indicates that a single radio access technology (RAT) is used for camping, and the multiple camping mode indicating that multiple RATs are used for camping. The single camping can reduce complexity of the mobile terminal and save energy. On the other hand, the multiple camping has the advantage of enhancing coverage, minimizing the risk of missing paging messages, reducing RAT re-selection delay, enabling faster and better RAT selection, reducing uplink interference, improving network resource pooling, and so on. It is to be noted that the above clarification of single camping mode and multiple camping mode is described for purpose of discussion. In some embodiments, the multiple camping mode may be discussed through a dual camping mode in which two RATs (for example, a primary RAT and a secondary RAT) are used for camping. Those skilled in the art would appreciate that the dual camping mode is illustrated as an example of the multiple camping mode, rather than limitation. In some other embodiments, the multiple camping mode may include three or more RATs.

In the scenario as discussed in FIG. 1, the mobile terminal 101 may be configured to perform in the single camping mode (for example, using the RAT of LTE or the RAT of NX) or perform in the multiple camping mode (for example, using both the RAT of LTE and the RAT of NX at the same time). However, if the mobile terminal 101 is configured as the single camping mode, the mobile terminal only monitors and measures on either LTE channels or NX channels. Although single camp simplifies the mobile terminal's configuration, it takes long time for the mobile terminal to use the second RAT due to a very bad channel quality of a first RAT (also referred to as "RAT 1" hereafter) or due to a very good channel quality of a second RAT (also referred to as "RAT 2" hereafter). Thus, if data needs to be transmitted during RAT re-selection, there will be long delay for the mobile terminal. And the mobile terminal may continue camping on RAT 1 once it camps on RAT 1 even although UE could receive better quality from RAT 2 when UE moves. Furthermore, in the case of the single camping mode, it is not possible to perform cross-RAT paging in which the paging is to be coordinated between different RATs.

On the other hand, if the mobile terminal 101 is configured as the multiple camping mode, the mobile terminal monitors and measures on both LTE channels and NX channels at the same time. With multiple camping, paging may be quicker in certain cases. And the network can decide which resources (NX or LTE) to use to locate the mobile terminal without impacting performance. Multiple camping also reduces uplink (UL) interference and improves seamless RAT usage. However the multiple camping increases the complexity and power consumption at the UE. Multiple camping may have large power consumption for the mobile terminal especially when for wideband system such as 3G/4G/5G.

Conventionally, once the mobile terminal 101 is configured to employ one of the single or multiple camping mode, it performs camping in the configured camping mode for a certain period. As such, even if network conditions or system requirements change, the mobile terminal 101 may still work in the configured camping mode which is not suitable for the current network conditions or system requirements any more.

In order to solve the above and other potential problems, embodiments of the present disclosure provides solutions for adaptively switching between the single camping mode and the multiple camping mode. In accordance with embodiments of the present disclosure, the mobile terminal may be switched to the multiple camping mode when a predetermined condition is fulfilled. On the other hand, the mobile terminal may be switched back to the single camping when another predetermined condition is fulfilled. The conditions for switching between the single camping mode and the multiple camping mode can be either network preconfigured and informed to mobile terminal via signaling or mobile terminal self-defined. In this way, it is possible to get a trade-off between the mobile terminal's power consumption and the mobile terminal's experience.

It is to be understood that the configuration of FIG. 1 is described merely for the purpose of illustration, without suggesting any limitation as to the scope of the present disclosure. Those skilled in the art will appreciate that the wireless communication network 100 may include any suitable number of mobile terminals and BSs and may have other suitable configurations.

Figure 2:
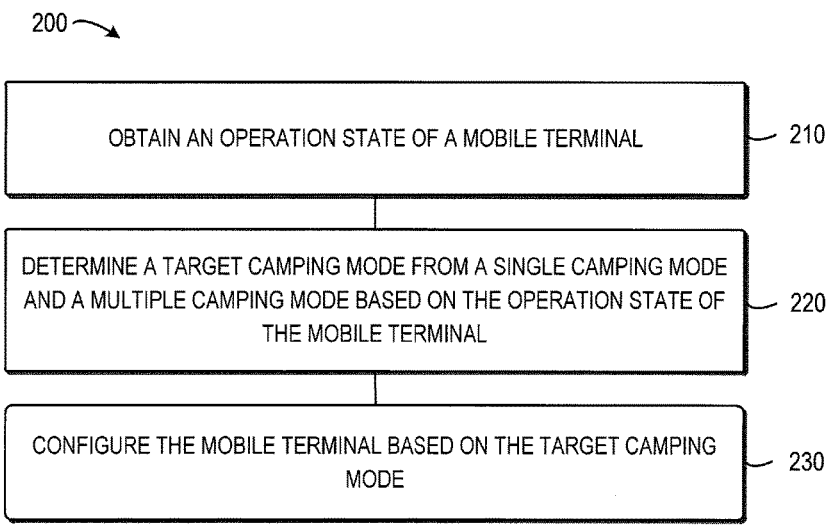
FIG. 2 shows a flowchart of a method 200 for performing camping implemented by a device in accordance with an embodiment of the present disclosure.

Now reference is made to FIG. 2, which shows a flowchart of a method 200 for performing camping implemented by a device in accordance with an embodiment of the present disclosure. With the method 200, the above and other potential deficiencies in the conventional approaches can be overcome. It would be appreciated by those skilled in the art that the method 200 may be implemented by a device, such as the BS 110, the BS 120, the mobile terminal 101 or other suitable devices. For the purpose of illustration, the method 200 will be described below with reference to the BS 110 in the wireless communication system 100.

The method 200 is entered in block 210, where an operation state of a mobile terminal is obtained. The operation state indicates a state of the operation of the mobile terminal. In some embodiments, in block 210, a variety of operation states may be obtained, which may be, for example, but not limited to: energy status of the mobile terminal; a QoS of the mobile terminal; an active time period or traffic amount of the mobile terminal; quality of a channel between the device and the mobile terminal; frequency of inter-RAT switching of the mobile terminal; and moving speed of the mobile terminal. The energy status indicates a condition of energy consumption of the mobile terminal, and may be reflected by a battery level of the mobile terminal. For example, if the battery of the mobile terminal has 90% power left, it may be determined that the mobile terminal has a higher battery level and thus may be determined that the energy status is good. It is to be noted that the above examples are only illustrated for description rather than limitation. Those skilled in the art would appreciate there may be many other suitable operation states. In addition, those skilled in the art would appreciate that any of the above examples may be obtained as the operation state in block 210.

According to embodiments of the present invention, the frequency of inter-RAT switching may indicate that the frequency of switching between different RATs in a predetermined time period. The frequency of inter-RAT switching may be obtained in a variety of ways. In some embodiments, the frequency of inter-RAT switching may be obtained from a historical record of the inter-RAT switching. Alternatively, in some embodiments, it may be determined a first coverage of a first node serving the mobile terminal and a second coverage of a second node in proximity of the first node, wherein the first node is associated with a first RAT and the second node is associated with a second RAT. Then, the frequency of inter-RAT switching may be determined based on the first coverage and the second coverage.

It is to be understood that the examples of the operation state are illustrated merely for the purpose of discussion, without suggesting any limitation as to the scope of the present disclosure. Those skilled in the art will appreciate that the mobile terminal may have many other suitable operation states which are not detailed here.

In block 220, a target camping mode is determined from a single camping mode and a multiple camping mode based on the operation state of the mobile terminal. According to embodiments of the present disclosure, the target camping mode may be determined as the single camping mode or the multiple camping mode in a variety of ways. In some embodiments, if energy status of the mobile terminal is obtained in block 210, the energy status may be compared with a threshold energy. The threshold energy is a threshold for the energy status of the mobile terminal, and may be predetermined or predefined according to historical energy status of the mobile terminal, system requirements or other suitable factors. In an example, the threshold energy may be set as 60% power left. If the current power of the mobile terminal exceeds 60%, it may be determined that the energy status exceeds the threshold energy, and the multiple camping mode may be determined as the target camping mode. Otherwise, the energy status is less than the threshold energy, and the single camping mode may be determined as the target camping mode.

In an embodiment, the inter-RAT (NX or LTE) measurements are supported. The mobile terminal either has dual Receivers (RXs) or one RX for both RATs which are coordinated. A mobile terminal which has dual RX and is capable of monitoring both LTE and NX simultaneously may be configured to use a single measurement period for both frequently transmitted LTE signals and scarcely transmitted NX signals. On the other hand, a single-RX mobile terminal may be configured to wake up to measure the NX signal and to remain awake to switch to LTE reception to measure the LTE signals. In both cases, the multiple camping mode requires more energy than the single camping mode. In the embodiment, if the battery level of a mobile terminal is lower than a predetermined threshold, that is, the energy status of the mobile terminal is high, the multiple camping mode may be determined as the target camping mode. If the battery level of the mobile terminal is higher than the threshold, for example, exceeding a higher threshold, the single camping mode may be determined as the target camping mode. In the case that the mobile terminal is camping in the multiple camping mode, it may be switched off from the multiple camping mode. It is to be understood that above embodiment is described for illustration, rather than limitation. For instance, in another embodiment, the multiple camping mode can also be switched off when the power saving mode is enabled in the mobile terminal.

Alternatively, in some embodiments, if the QoS of the mobile terminal is obtained in block 210, the QoS may be compared with a threshold QoS. The QoS may include, for example, but not limited to, delay, throughput, and so on. The threshold QoS is a threshold for the QoS of the mobile terminal, and may be predetermined or predefined according to network conditions, system requirements, capabilities of the mobile terminal or other suitable factors. If the QoS exceeding the threshold QoS, the multiple camping mode may be determined as the target camping mode. Otherwise, the single camping mode may be determined as the target camping mode.

In an embodiment, if the last session of the mobile terminal is delay sensitive or high throughput, the multiple camping mode may be determined as the target camping mode. In another embodiment, for critical machine-type communication (MTC) which requires low latency, the multiple camping mode may be determined as the target camping mode. In this way, transmission delay can be reduced and reliability can be guaranteed.

Alternatively, in some embodiments, if the active time period of the mobile terminal is obtained in block 210, it may be determined in block 220 whether the active time period exceeds a threshold time, for example, by comparing the active time period with the threshold time. The active time period may refer to a time interval during which the mobile terminal is active, for example, performing communication with other devices. If so, the multiple camping mode may be determined as the target camping mode. Otherwise, the single camping mode may be determined as the target camping mode. In an embodiment, if there is no traffic for a period (a timer can be used), then the multiple camping mode can be switched off and the single camping mode may be determined as the target camping mode. In another embodiment, the multiple camping mode may be determined as the target camping mode during day time and may be turned off during night when there is little traffic. In this case, the single camping mode may be determined as the target camping mode during night.

Alternatively, in some embodiments, if the traffic amount of the mobile terminal is obtained in block 210, it may be determined in block 220 whether the traffic amount exceeds a threshold amount, for example, by comparing the traffic amount with the threshold amount. If so, the multiple camping mode may be determined as the target camping mode. Otherwise, the single camping mode may be determined as the target camping mode. In an embodiment, the traffic amount may be predicted based on historical amount of the traffic of the mobile terminal. If the predicted traffic is high, the multiple camping mode may be determined as the target camping mode. When traffic starts, the mobile terminal can quickly use the RAT which can provide high data rate, or use multiple-connectivity.

Alternatively, in some embodiments, if quality of a channel (also referred to as "channel quality" hereafter) between the device and the mobile terminal is obtained in block 210, it may be determined in block 220 whether the quality exceeding a threshold quality, for example, by comparing the quality with the threshold quality. The threshold quality may be a threshold of channel quality, and may be predetermined or predefined according to network conditions, system requirements, and so on. If the obtained quality exceeds the threshold quality, the multiple camping mode may be determined as the target camping mode. Otherwise, the single camping mode may be determined as the target camping mode. In the example of FIG. 1, if the mobile terminal 101 is camped in the cell 111, Reference Signal Receiving Power (RSRP) of the cell 111 may be obtained as the channel quality. If the RSRP is lower than the threshold quality, for example, −90 dBm, the multiple camping mode may be determined as the target camping mode. Then, the mobile terminal may trigger measurement on another RAT. In the multiple camping mode, if the channel quality associated with a first RAT is good enough while the channel quality associated with a second RAT is too poor, that is, if the difference between the channel quality associated with different RATs is large enough, the single camping mode may be determined as the target camping mode.

Alternatively, in some embodiments, in response to the frequency of inter-RAT switching of the mobile terminal being obtained in block 210, it may be determined in block 220 whether the frequency exceeding a threshold frequency, for example, by comparing the frequency with the threshold frequency. If the frequency exceeding the threshold frequency, the multiple camping mode may be determined as the target camping mode. Otherwise, the single camping mode may be determined as the target camping mode. In some embodiments, the frequency of inter-RAT switching may be determined according coverage status. If there is a mismatch between coverages of multiple RATs, the inter-RAT switching may have high frequency. If there is large coverage hole of one RAT, or one RAT is only used to cover a hotspot, the inter-RAT switching may have high frequency.

In an embodiment, if there is frequent inter-RAT switch, multiple camping mode may be determined as the target camping mode. In the example of FIG. 1, when the mobile terminal 101 is in the coverage of the BS 120, the mobile terminal 101 may use the RAT of the NX system to access;

and when the mobile terminal 101 moves to another position which is in the coverage of the BS 110 and out of coverages of other BSs, the mobile terminal 101 may use the RAT of the LTE system to access. If such switch of RATs (also referred to as the "inter-RAT switch") is frequent, for example, its frequency exceeding the threshold frequency, the multiple camping mode may be determined as the target camping mode.

Alternatively, in some embodiments, if the moving speed of the mobile terminal is obtained in block 210, it may be determined in block 220 whether the moving speed being less than a speed threshold, for example, by comparing the moving speed with the speed threshold. If so, the multiple camping mode may be determined as the target camping mode; otherwise, the single camping mode may be determined as the target camping mode. The moving speed of the mobile terminal may be determined in several ways, for example by means of satellite systems, such as Global Positioning System (GPS) or self-contained by the NX system.

In block 230, the mobile terminal is configured based on the target camping mode. In some embodiments where the method 200 is performed by a device such as the BS 110 or other suitable server, the device may send an indication of the target camping mode to the mobile terminal 101. Upon receipt of the indication, the mobile terminal 101 may be aware of the target camping mode is to be employed, and thus may perform camping according to the target camping mode. According to embodiments of the present disclosure, the indication may be sent via a dedicated signal, a broadcast signal, or in any other suitable formats.

Alternatively, in some embodiments where the method 200 is performed by the mobile terminal 101, after determining the target camping mode in blocks 210 and 220, the mobile terminal 101 may configure itself so as to perform camping according to the target camping mode.

It is to be understood that although the above embodiments are discussed with respect to the RAT of NX and the RAT of the LTE, this is merely for the purpose of illustration, without suggesting any limitation as to the scope of the present disclosure. Those skilled in the art will appreciate that RATs of other systems, such as WCDMA-HSPA and TD-SCDMA, CDMA2000 and so on, are also applicable.

As discussed above, a suitable camping mode may be determined based on the operation state of the mobile terminal. In this way, the mobile terminal can be configured with a suitable camping mode in a dynamic way. As a result, it is possible for the mobile terminal to access to a better RAT. As such, latency for service initiation during RAT re-selection can be reduced, and power can be saved when the multiple camping mode is not needed.

Figure 3:
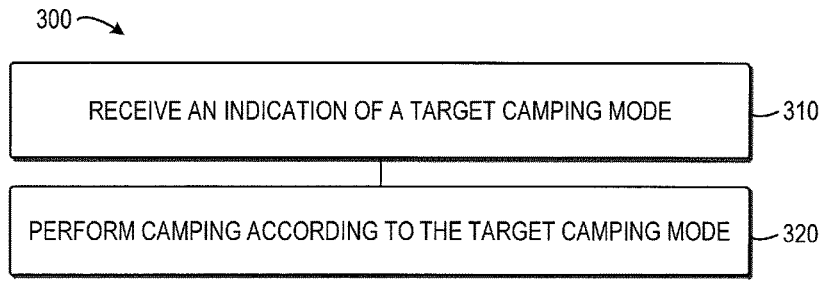
FIG. 3 shows a flowchart of a method 300 for performing camping implemented by a mobile terminal in accordance with an embodiment of the present disclosure.

Reference is now made to FIG. 3, which shows a flowchart of a method 300 for performing camping implemented by a mobile terminal in accordance with an embodiment of the present disclosure. With the method 300, the above and other potential deficiencies in the conventional approaches can be overcome. It would be appreciated by those skilled in the art that the method 300 may be implemented by a mobile terminal or other suitable devices. For the purpose of illustration, the method 300 will be described below with reference to the mobile terminal 101 in the wireless communication system 100.

The method 300 is entered in block 310, where an indication of a target camping mode is received. According to embodiments of the present disclosure, the target camping mode may be determined from a single camping mode and a multiple camping mode based on the operation state of the mobile terminal. The determination of the target camping mode may be implemented according to embodiments described with reference to the method 200 in FIG. 2 and are thus not detailed here.

In some embodiments, the mobile terminal may receive the indication of the target camping mode via legacy signaling or other suitable signaling that is to be developed in the future.

In block 320, camping is performed according to the target camping mode. According to embodiments of the present disclosure, the camping may be performed in a variety of ways. As discussed above, the single camping mode indicates that a single RAT is used in camping, and the multiple camping mode indicates that multiple RATs are used in camping. In some embodiments, in the multiple camping mode, the mobile terminal monitors and measures on multiple RATs but only reports its location with respect to one RAT, referred to as a "primary RAT" hereafter, to the network most of the time. The mobile terminal only reports its location in another RAT (referred to as a "secondary RAT" hereafter) when certain conditions are met. In an embodiment, the RAT in which the mobile terminal reports its location most of the time may be determined as the primary RAT, and the other RAT monitored by the mobile terminal but involved less in reporting location of the mobile terminal may be determined as the secondary RAT.

In some embodiments, if the target camping mode is the multiple camping mode, the primary RAT is to be determined as a RAT that is associated with a better coverage. Thus, the primary RAT may be determined based on signaling load incurred for the mobile terminal, whether the mobile terminal can be located by network, and so on. In the example of FIG. 1, the primary RAT may be determined as the RAT of the LTE system, as long as channel quality of the LTE system is not less than a predetermined threshold.

Figure 4:
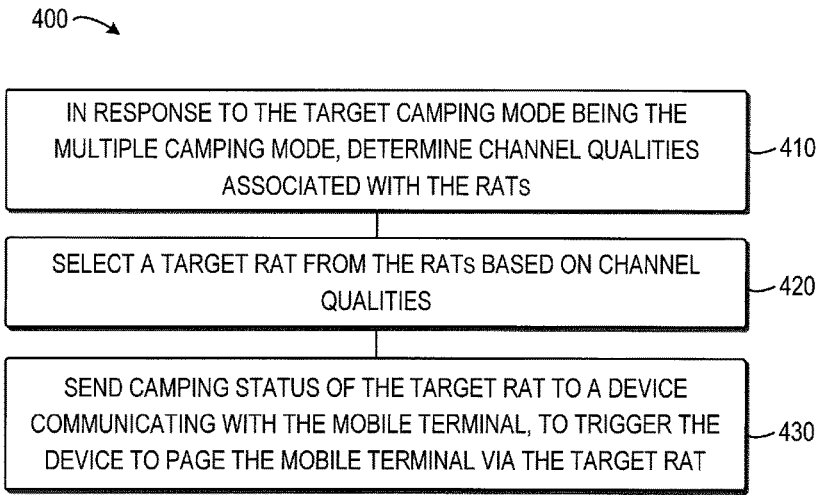
FIG. 4 shows a flowchart of a method 400 for performing camping implemented by a mobile terminal in accordance with an embodiment of the present disclosure.

Alternatively or additionally, in some embodiments, a target RAT may be determined from the multiple RATs, and camping status of the target RAT may be also reported to the device. FIG. 4 shows a flowchart of a method 400 for performing camping implemented by a mobile terminal in accordance with an embodiment of the present disclosure. In the embodiment of FIG. 4, in block 410, in response to the target camping mode being the multiple camping mode, channel qualities associated with the multiple RATs are determined. In block 420, a target RAT is selected from the RATs based on the channel qualities. In block 430, camping status of the target RAT is sent to a device communicating with the mobile terminal, to trigger the device to page the mobile terminal via the target RAT. The device may be a BS serving the mobile terminal, a server or controller managing communication of the mobile terminal, or any other suitable device or node in the network. In some embodiments, the BS may receive from the mobile terminal camping status of the target RAT, and then the BS may page the mobile terminal via the target RAT.

In an embodiment, the device (or the network) only knows the location of the mobile terminal in the primary RAT, so it will page the mobile terminal via the primary RAT. Upon receipt of the paging message, the mobile terminal may determine the target RAT to respond so as to optimize its performance. For example, if the channel quality of the primary RAT is better than the secondary RAT, the mobile terminal may choose to setup connection via the primary RAT. However, if the channel quality of the secondary RAT is better than the primary RAT, for example, the difference between the channel qualities exceeding a predetermined threshold, the mobile terminal may setup connection via the secondary RAT. In another embodiment, for a terminal initiated session, the mobile terminal has the freedom to select one of the camped RATs to setup connection. In this way, the benefit of multiple camping is achieved.

Figure 5:
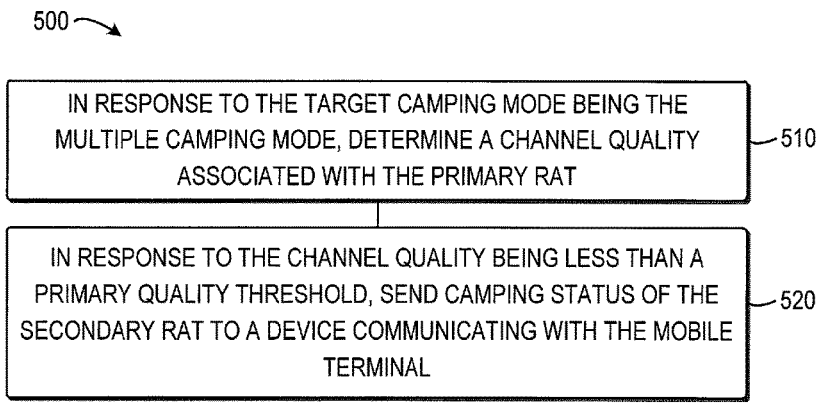
FIG. 5 shows a flowchart of a method 500 for performing camping implemented by a mobile terminal in accordance with an embodiment of the present disclosure.

In some embodiments, in the multiple camping mode, the device has camping status of the primary RAT, but does not know the camping status of the secondary RAT. According to embodiments of the present disclosure, some factors, such as channel quality or work load associated with the primary RAT, may trigger the report of the camping status of the secondary RAT. FIG. 5 shows a flowchart of a method 500 for performing camping implemented by a mobile terminal in accordance with an embodiment of the present disclosure. In the embodiment of FIG. 5, channel quality associated with the primary RAT may trigger the report of the camping status of the secondary RAT. The method 500 is entered in block 510, where in response to the target camping mode being the multiple camping mode, a channel quality associated with the primary RAT is determined. The channel quality may be obtained by measuring reference signals transmitted from the cell associated with the primary RAT and the mobile terminal. Then, in block 520, the mobile terminal may send the camping status of the secondary RAT to the device if the channel quality is less than the primary quality threshold. The primary quality threshold may be predetermined based on various factors, such as historical channel quality, system requirements and network conditions.

Figure 6:
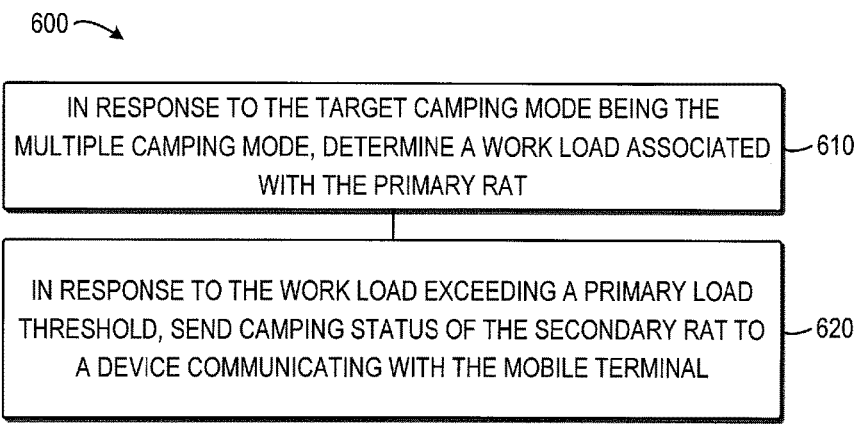
FIG. 6 shows a flowchart of a method 600 for performing camping implemented by a mobile terminal in accordance with an embodiment of the present disclosure.

Alternatively, in some embodiments, work load associated with the primary RAT may also trigger the report of the camping status of the secondary RAT. FIG. 6 shows a flowchart of a method 600 for performing camping implemented by a mobile terminal in accordance with an embodiment of the present disclosure. In the method 600, in block 610, in response to the target camping mode being the multiple camping mode, a work load associated with the primary RAT is determined. The work load may be determined in several ways. In an embodiment, the work load may be determined from throughput in a cell associated with the primary RAT in a past time interval. The past time interval may be predetermined in several ways, which are appreciated by those skilled in the art and thus are not detailed here. In an alternative embodiment, radio resource utilization of the primary RAT may be obtained, for example, through broadcasted information or some other indicators. Then, in block 620, in response to the work load exceeding a primary load threshold, camping status of the secondary RAT is sent to the device communicating with the mobile terminal. The primary load threshold may be predetermined based on various factors, such as historical work load, system requirements and network conditions.

The camping status of the secondary RAT may be sent during setup of radio connection via the primary RAT. In an embodiment, such report of the camping status of the secondary RAT may be performed according to predefined rules or configurations from the primary RAT during the radio connection setup with the primary RAT. The contention of the report may be predefined. The network may use the camping status with respect to the secondary RAT for various purposes, for instance, dual connections between RATs and load sharing between the RATs.

According to embodiments of the present disclosure, the camping status may include various information, including, but not limited to, information about whether the mobile terminal camps on a secondary RAT or not, the identification of the secondary RAT, radio quality of the secondary RAT on which the mobile terminal camps on, and/or the like.

In some embodiments, for the mobile terminal, the primary RAT may be changed. In an embodiment, the change of the primary RAT may be triggered when channel quality of the primary RAT is lower than a predefined threshold. This predefined threshold may be set as being lower than a threshold for triggering the mobile terminal to report its location with respect to the secondary RAT. In this way, during the period when the primary RAT changes, the mobile terminal's performance will not be deteriorated because the network knows the mobile terminal's location in the secondary RAT, so paging can be transmitted via the secondary RAT.

In an embodiment, the network knows the change of the primary RAT either via explicit signaling in location update message or via a timer implicitly. When this timer expires, if the network does not receive location update for the existing primary RAT and at the same time the network receives location update for another RAT, then the network knows that the primary RAT has been changed to a new RAT.

Alternatively, in an embodiment, the switch of the primary RAT may be triggered via a location report. In particular, if the mobile terminal reports the location with respect to a first RAT, then the first RAT may be determined as the primary RAT. On the other hand, if the mobile terminal reports the location with respect to a second RAT, then the second RAT may be determined as the primary RAT. When the network receives location update report for both RATs, the primary RAT does not change.

Alternatively, in an embodiment, even the location report is triggered by the location change with respect to the primary RAT, the mobile terminal may be required to report the location with respect to the secondary RAT together with the location report with respect to the primary RAT in the same message.

In some embodiments, the BS may receive camping status of the primary RAT and the secondary RAT from the mobile terminal. Then, the BS may page the mobile terminal via at least one of the primary RAT and the secondary RAT.

In some embodiments, in the multiple camping mode, the BS may page the mobile terminal via the primary RAT first. Upon receipt of a negative response to the paging from the mobile terminal, the BS may page the mobile terminal via the secondary RAT.

In one embodiment, the BS or other suitable network node in the wireless communication network may maintain the camping status of each mobile terminal according to the location report, including the primary camped RAT and the secondary camped RAT for each mobile terminal according to the mobile terminal report in a track area report message.

As one further embodiment, the BS or other suitable network node may further determine to use which RAT to page a mobile terminal when there is session for the mobile terminal when it received location update from the mobile terminal for both RATs. The BS may first page the mobile terminal via the primary RAT. If there is no response determined from the mobile terminal, the BS may further page the mobile terminal via the secondary RAT even if the camping status may not be available by the network.

In some embodiments, the BS or other suitable network node may send a camping indication to the device. The camping indication may indicate whether the mobile terminal camps on the secondary RAT.

According to the embodiments illustrated with respect to FIGS. 3-6, the operations performed by the mobile terminal are transparent to the BS or the network. As such, to a certain extent, the mobile terminal's behavior is a kind of mix of single-RAT camp and multiple-RAT camp. The mobile terminal still monitors and measures signals from both RATs, but it only reports its location of one RAT to the BS or the network most of the time. The mobile terminal reports its location with respect to multiple RATs to the BS or the network only when some conditions are met. In this way, signaling overhead (for example, TRA update and paging) of multiple-RAT camping mode can be reduced a lot while most of the advantage of multiple-RAT camping mode can still be maintained.

Figure 7:
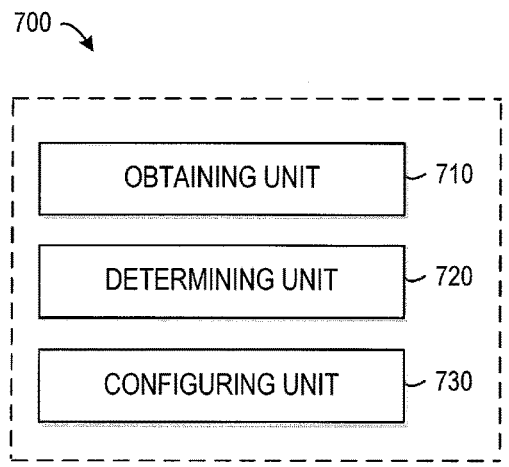
FIG. 7 shows a block diagram of a device 700 in accordance with an embodiment of the present disclosure.

FIG. 7 shows a block diagram of a device 700 in accordance with an embodiment of the present disclosure. It would be appreciated that the device 700 may be implemented by the BS 110, the BS 120, the mobile terminal 101 or other suitable devices.

As shown, the device 700 includes an obtaining unit 710, a determining unit 720 and a configuring unit 730. The obtaining unit 710 is configured to obtain an operation state of a mobile terminal. The determining unit 720 is configured to determine a target camping mode from a single camping mode and a multiple camping mode based on the operation state of the mobile terminal, the single camping mode indicating that a single RAT is used for camping, and the multiple camping mode indicating that multiple RATs are used for camping. The configuring unit 730 is configured to configure the mobile terminal based on the target camping mode.

In an embodiment, the obtaining unit 710 may be further configured to: obtain at least one of: energy status of the mobile terminal; a QoS of the mobile terminal; an active time period or traffic amount of the mobile terminal; quality of a channel between the device and the mobile terminal; frequency of inter-RAT switching of the mobile terminal; and moving speed of the mobile terminal.

In an embodiment, the obtaining unit 710 may be further configured to obtain the frequency of inter-RAT switching from a historical record of the inter-RAT switching; and/or may be further configured to determine a first coverage of a first node serving the mobile terminal and a second coverage of a second node in proximity of the first node, the first node being associated with a first RAT and the second node being associated with a second RAT, and determine the frequency of inter-RAT switching based on the first coverage and the second coverage.

In an embodiment, the determining unit 720 may be further configured to: in response to energy status of the mobile terminal being obtained, compare the energy status with a threshold energy; in response to the energy status exceeding the threshold energy, determine the multiple camping mode as the target camping mode; and in response to the energy status being less than the threshold energy, determine the single camping mode as the target camping mode.

In an embodiment, the determining unit 720 may be further configured to: in response to a QoS of the mobile terminal being obtained, compare the QoS with a threshold QoS; in response to the QoS exceeding the threshold QoS, determine the multiple camping mode as the target camping mode; and in response to the QoS being less than a threshold QoS, determine the single camping mode as the target camping mode.

In an embodiment, the determining unit 720 may be further configured to: in response to an active time period or traffic amount of the mobile terminal being obtained, compare the active time period with a threshold time or compare the traffic amount with a threshold amount; in response to the active time period exceeding the threshold time or the traffic amount exceeding the threshold amount, determine the multiple camping mode as the target camping mode; and in response to the active time period being less than the threshold time or the traffic amount being less than the threshold amount, determine the single camping mode as the target camping mode.

In an embodiment, the determining unit 720 may be further configured to: in response to quality of a channel between the device and the mobile terminal being obtained, compare the quality with a threshold quality; in response to the quality exceeding the threshold quality, determine the multiple camping mode as the target camping mode; and in response to the quality being less than the threshold quality, determine the single camping mode as the target camping mode.

In an embodiment, the determining unit 720 may be further configured to: in response to frequency of inter-RAT switching of the mobile terminal being obtained, compare the frequency with a threshold frequency; in response to the frequency exceeding the threshold frequency, determine the multiple camping mode as the target camping mode; and in response to the frequency being less than the threshold frequency, determine the single camping mode as the target camping mode.

In an embodiment, the determining unit 720 may be further configured to: in response to moving speed of the mobile terminal being obtained, compare the moving speed with a speed threshold; in response to the moving speed being less than the speed threshold, determine the multiple camping mode as the target camping mode; and in response to the moving speed exceeding the speed threshold, determine the single camping mode as the target camping mode.

In an embodiment, the configuring unit 730 may be further configured to: send an indication of the target camping mode to the mobile terminal.

Figure 8:
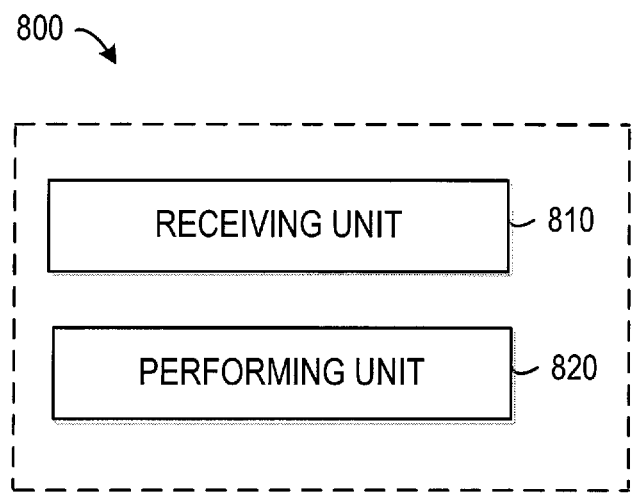
FIG. 8 shows a block diagram of a mobile terminal 800 in accordance with an embodiment of the present disclosure.

FIG. 8 shows a block diagram of a mobile terminal 800 in accordance with an embodiment of the present disclosure. It would be appreciated that the mobile terminal 800 may be implemented by the mobile terminal 101 as shown in FIG. 1 or other suitable devices.

As shown, the mobile terminal 800 includes a receiving unit 810 and a performing unit 820. The receiving unit 810 is configured to receive an indication of a target camping mode, the target camping mode being determined from a single camping mode and a multiple camping mode based on an operation state of the mobile terminal, the single camping mode indicating that a single RAT is used in camping, and the multiple camping mode indicating that multiple RATs are used in camping. The performing unit 820 is configured to perform camping according to the target camping mode.

In an embodiment, the performing unit 820 may be further configured to: in response to the target camping mode being the multiple camping mode, determine channel qualities associated with the multiple RATs; select a target RAT from the multiple RATs based on the channel qualities; and send camping status of the target RAT to a device communicating with the mobile terminal, to trigger the device to page the mobile terminal via the target RAT.

In an embodiment, the multiple RATs may include a primary RAT and a secondary RAT, and the performing unit 820 may be further configured to: in response to the target camping mode being the multiple camping mode, determine a channel quality associated with the primary RAT; and in response to the channel quality being less than a primary quality threshold, send camping status of the secondary RAT to a device communicating with the mobile terminal 800.

In an embodiment, the multiple RATs may include a primary RAT and a secondary RAT, and the performing unit 820 may be further configured to: in response to the target camping mode being the multiple camping mode, determine a work load associated with the primary RAT; and in response to the work load exceeding a primary load threshold, send camping status of the secondary RAT to a device communicating with the mobile terminal 800.

In an embodiment, the camping status of the secondary RAT may be sent during setup of radio connection via the primary RAT.

In an embodiment, the mobile terminal 800 may further include: a transmitting unit configured to send a camping indication to the device, the camping indication indicating whether the mobile terminal camps on the secondary RAT.

It should be appreciated that components included in the device 700 correspond to the blocks of the method 200, and components included in the mobile terminal 800 correspond to the blocks of the methods 300-600. Therefore, all operations and features described above with reference to FIG. 2 are likewise applicable to the components included in the device 700 and have similar effects, and all operations and features described above with reference to FIGS. 3-6 are likewise applicable to the components included in the mobile terminal 800 and have similar effects. For the purpose of simplification, the details will be omitted.

The components included in the device 700 and the mobile terminal 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the device 700 and the mobile terminal 800 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented in a wireless communication network. It would be appreciated that the apparatus may be implemented at the BS 110, the BS 120, the mobile terminal 101 or other suitable devices. The apparatus includes: means for obtaining an operation state of a mobile terminal; means for determining a target camping mode from a single camping mode and a multiple camping mode based on the operation state of the mobile terminal, the single camping mode indicating that a single RAT is used for camping, and the multiple camping mode indicating that multiple RATs are used for camping; and means for configuring the mobile terminal based on the target camping mode.

In an embodiment, the means for obtaining the operation state may include obtaining at least one of: energy status of the mobile terminal; a QoS of the mobile terminal; an active time period or traffic amount of the mobile terminal; quality of a channel between the device and the mobile terminal; frequency of inter-RAT switching of the mobile terminal; and moving speed of the mobile terminal.

In an embodiment, the means for obtaining the frequency of inter-RAT switching may include at least one of: means for obtaining the frequency of inter-RAT switching from a historical record of the inter-RAT switching; and means for determining a first coverage of a first node serving the mobile terminal and a second coverage of a second node in proximity of the first node, the first node being associated with a first RAT and the second node being associated with a second RAT, and determining the frequency of inter-RAT switching based on the first coverage and the second coverage.

In an embodiment, the means for determining the target camping mode may include: means for, in response to energy status of the mobile terminal being obtained, comparing the energy status with a threshold energy; means for, in response to the energy status exceeding the threshold energy, determining the multiple camping mode as the target camping mode; and means for, in response to the energy status being less than the threshold energy, determining the single camping mode as the target camping mode.

In an embodiment, the means for determining the target camping mode may include: means for, in response to a QoS of the mobile terminal being obtained, comparing the QoS with a threshold QoS; means for, in response to the QoS exceeding the threshold QoS, determining the multiple camping mode as the target camping mode; and means for, in response to the QoS being less than a threshold QoS, determining the single camping mode as the target camping mode.

In an embodiment, the means for determining the target camping mode may include: means for, in response to an active time period or traffic amount of the mobile terminal being obtained, comparing the active time period with a threshold time or the traffic amount exceeds a threshold amount; means for, in response to the active time period exceeding the threshold time or the traffic amount exceeding the threshold amount, determining the multiple camping mode as the target camping mode; and means for, in response to the active time period being less than the threshold time or the traffic amount being less than the threshold amount, determining the single camping mode as the target camping mode.

In an embodiment, the means for determining the target camping mode may include: means for, in response to quality of a channel between the device and the mobile terminal being obtained, comparing the quality with a threshold quality; means for, in response to the quality exceeding the threshold quality, determining the multiple camping mode as the target camping mode; and means for, in response to the quality being less than the threshold quality, determining the single camping mode as the target camping mode.

In an embodiment, the means for determining the target camping mode may include: means for, in response to frequency of inter-RAT switching of the mobile terminal being obtained, comparing the frequency with a threshold frequency; means for, in response to the frequency exceeding the threshold frequency, determining the multiple camping mode as the target camping mode; and means for, in response to the frequency being less than the threshold frequency, determining the single camping mode as the target camping mode.

In an embodiment, the means for determining the target camping mode may include: means for, in response to moving speed of the mobile terminal being obtained, comparing the moving speed with a speed threshold; means for, in response to the moving speed being less than the speed threshold, determining the multiple camping mode as the target camping mode; and means for, in response to the moving speed exceeding the speed threshold, determining the single camping mode as the target camping mode.

In an embodiment, the means for configuring the mobile terminal may include: means for sending an indication of the target camping mode to the mobile terminal.

In accordance with embodiments of the present disclosure, there is provided an apparatus implemented in a wireless communication network. It would be appreciated that the apparatus may be implemented at the mobile terminal 101 as shown in FIG. 1 or other suitable devices. The apparatus includes: means for receiving an indication of a target camping mode, the target camping mode being determined from a single camping mode and a multiple camping mode based on an operation state of the mobile terminal, the single camping mode indicating that a single RAT is used in camping, and the multiple camping mode indicating that multiple RATs are used in camping; and means for performing camping according to the target camping mode.

In an embodiment, the means for performing camping according to the target camping mode may include: means for, in response to the target camping mode being the multiple camping mode, determining channel qualities associated with the multiple RATs; means for selecting a target RAT from the multiple RATs based on the channel qualities; and means for sending camping status of the target RAT to a device communicating with the mobile terminal, to trigger the device to page the mobile terminal via the target RAT.

In an embodiment, the multiple RATs may include a primary RAT and a secondary RAT, and the means for performing camping according to the target camping mode may include: means for, in response to the target camping mode being the multiple camping mode, determining a channel quality associated with the primary RAT; and means for, in response to the channel quality being less than a primary quality threshold, sending camping status of the secondary RAT to a device communicating with the mobile terminal.

In an embodiment, the multiple RATs may include a primary RAT and a secondary RAT, and the means for performing camping according to the target camping mode may include: means for, in response to the target camping mode being the multiple camping mode, determining a work load associated with the primary RAT; and means for, in response to the work load exceeding a primary load threshold, sending camping status of the secondary RAT to a device communicating with the mobile terminal.

In an embodiment, the camping status of the secondary RAT may be sent during setup of radio connection via the primary RAT.

In an embodiment, the apparatus may further include: means for sending a camping indication to the device, the camping indication indicating whether the mobile terminal camps on the secondary RAT.

Figure 9:
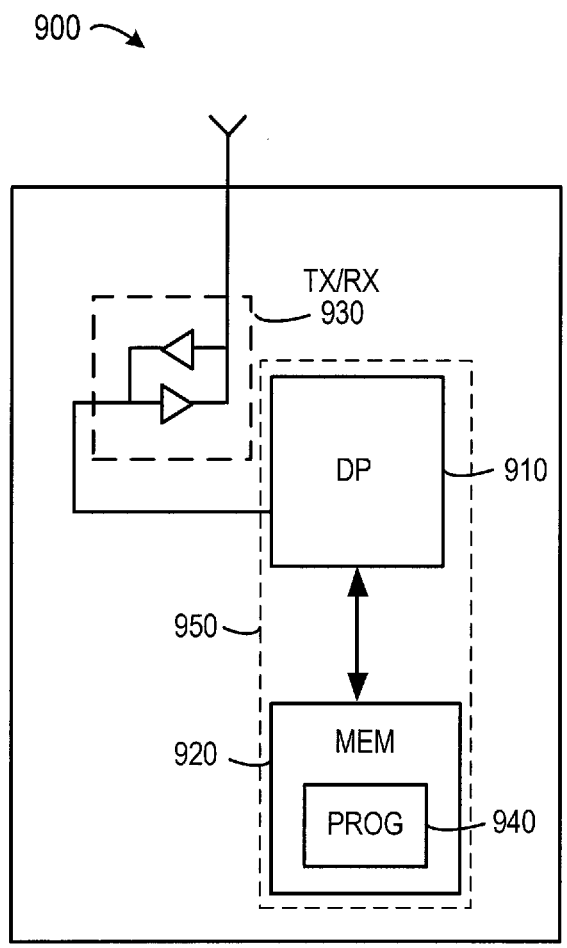
FIG. 9 shows a simplified block diagram 900 of a device that is suitable for use in implementing embodiments of the present disclosure.

FIG. 9 shows a simplified block diagram of a device 900 that is suitable for use in implementing embodiments of the present disclosure. It would be appreciated that the device 900 may be implemented by the device, such as, the BS 110, the BS 120, or the mobile terminal 101.

As shown, the device 900 includes a data processor (DP) 910, a memory (MEM) 920 coupled to the DP 910, a suitable RF transmitter TX and receiver RX 940 coupled to the DP 910, and a communication interface 950 coupled to the DP 910. The MEM 920 stores a program (PROG) 930. The TX/RX 940 is for bidirectional wireless communications. Note that the TX/RX 940 has at least one antenna to facilitate communication, though in practice an Access Node mentioned in this application may have several ones. The communication interface 950 may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The PROG 930 is assumed to include program instructions that, when executed by the associated DP 910, enable the device 900 to operate in accordance with the embodiments of the present disclosure, as discussed herein with the methods 200 to 300 in FIGS. 2 to 3 or the method 400 in FIG. 4. The embodiments herein may be implemented by computer software executable by the DP 910 of the device 900, or by hardware, or by a combination of software and hardware. A combination of the data processor 910 and MEM 920 may form processing means 960 adapted to implement various embodiments of the present disclosure.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 900, there may be several physically distinct memory modules in the device 900. The DP 910 may be of any type suitable to the local technical environment, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented by a device, comprising:
    obtaining an operation state of a mobile terminal;
    determining a target camping mode from a single camping mode and a multiple camping mode based on the operation state of the mobile terminal, the single camping mode indicating that a single radio access technology (RAT) is used for camping, and the multiple camping mode indicating that multiple RATs are used for camping, wherein determining the target camping mode comprises:
        in response to an active time period or traffic amount of the mobile terminal being obtained, comparing the active time period to a threshold time or comparing a traffic amount of the mobile terminal to a threshold amount
        in response to the active time period exceeding the threshold time or the traffic amount exceeding the threshold amount, determining the multiple camping mode as the target camping mode, and
        in response to the active time period being less than the threshold time or the traffic amount being less than the threshold amount, determining the single camping mode as the target camping mode; and
    configuring the mobile terminal based on the target camping mode.

2. The method according to claim 1, wherein obtaining the operation state comprises obtaining at least one of:
    an energy status of the mobile terminal;
    a Quality of Service (QoS) of the mobile terminal;
    an active time period or traffic amount of the mobile terminal;
    quality of a channel between the device and the mobile terminal;
    a frequency of inter-RAT switching of the mobile terminal; and
    a moving speed of the mobile terminal.

3. The method according to claim 2, wherein obtaining the frequency of inter-RAT switching comprises at least one of:
    obtaining the frequency of inter-RAT switching from a historical record of the inter-RAT switching; and
    determining a first coverage of a first node serving the mobile terminal and a second coverage of a second node in proximity of the first node, the first node being associated with a first RAT and the second node being associated with a second RAT, and
    determining the frequency of inter-RAT switching based on the first coverage and the second coverage.

4. The method according to claim 1, wherein determining the target camping mode further comprises:
    in response to an energy status of the mobile terminal being obtained, comparing the energy status with a threshold energy;
    in response to the energy status exceeding the threshold energy, determining the multiple camping mode as the target camping mode; and
    in response to the energy status being less than the threshold energy, determining the single camping mode as the target camping mode.

5. The method according to claim 1, wherein determining the target camping mode further comprises:
    in response to a Quality of Service (QoS) of the mobile terminal being obtained, comparing the QoS with a threshold QoS;
    in response to the QoS exceeding the threshold QoS, determining the multiple camping mode as the target camping mode; and in response to the QoS being less than a threshold QoS, determining the single camping mode as the target camping mode.

6. The method according to claim 1, wherein determining the target camping mode further comprises:
in response to quality of a channel between the device and the mobile terminal being obtained, comparing the quality with a threshold quality;
in response to the quality exceeding the threshold quality, determining the multiple camping mode as the target camping mode; and
in response to the quality being less than the threshold quality, determining the single camping mode as the target camping mode.

7. The method according to claim 1, wherein determining the target camping mode further comprises:
in response to a frequency of inter-RAT switching of the mobile terminal being obtained, comparing the frequency with a threshold frequency;
in response to the frequency exceeding the threshold frequency, determining the multiple camping mode as the target camping mode; and
in response to the frequency being less than the threshold frequency, determining the single camping mode as the target camping mode.

8. The method according to claim 1, wherein determining the target camping mode further comprises:
in response to a moving speed of the mobile terminal being obtained, comparing the moving speed with a speed threshold;
in response to the moving speed being less than the speed threshold, determining the multiple camping mode as the target camping mode; and
in response to the moving speed exceeding the speed threshold, determining the single camping mode as the target camping mode.

9. The method according to claim 1, wherein configuring the mobile terminal comprises:
sending an indication of the target camping mode to the mobile terminal.

10. A method implemented by a mobile terminal, comprising:
receiving an indication of a target camping mode, the target camping mode being determined from a single camping mode and a multiple camping mode based on an operation state of the mobile terminal, the single camping mode indicating that a single radio access technology (RAT) is used in camping, and the multiple camping mode indicating that multiple RATs are used in camping, wherein determining the target camping mode comprises:
in response to an active time period or traffic amount of the mobile terminal being obtained, comparing the active time period to a threshold time or comparing a traffic amount of the mobile terminal to a threshold amount
in response to the active time period exceeding the threshold time or the traffic amount exceeding the threshold amount, determining the multiple camping mode as the target camping mode, and
in response to the active time period being less than the threshold time or the traffic amount being less than the threshold amount, determining the single camping mode as the target camping mode; and
performing camping according to the target camping mode.

11. The method according to claim 10, wherein performing camping according to the target camping mode comprises:
in response to the target camping mode being the multiple camping mode, determining channel qualities associated with the multiple RATs;
selecting a target RAT from the multiple RATs based on the channel qualities; and
sending camping status of the target RAT to a device communicating with the mobile terminal, to trigger the device to page the mobile terminal via the target RAT.

12. The method according to claim 10, wherein the multiple RATs include a primary RAT and a secondary RAT, and wherein performing camping according to the target camping mode comprises:
in response to the target camping mode being the multiple camping mode, determining a channel quality associated with the primary RAT; and
in response to the channel quality being less than a primary quality threshold, sending camping status of the secondary RAT to a device communicating with the mobile terminal.

13. The method according to claim 10, wherein the multiple RATs include a primary RAT and a secondary RAT, and wherein performing camping according to the target camping mode comprises:
in response to the target camping mode being the multiple camping mode, determining a work load associated with the primary RAT; and
in response to the work load exceeding a primary load threshold, sending camping status of the secondary RAT to a device communicating with the mobile terminal.

14. The method according to claim 12, wherein the camping status of the secondary RAT is sent during setup of radio connection via the primary RAT.

15. The method according to claim 12, further comprising:
sending a camping indication to the device, the camping indication indicating whether the mobile terminal camps on the secondary RAT.

16. A device, comprising:
a processor and a non-transitory machine-readable storage medium containing program including instructions executable by the processor, the processor being configured to cause the device to:
obtain an operation state of a mobile terminal,
determine a target camping mode from a single camping mode and a multiple camping mode based on the operation state of the mobile terminal, the single camping mode indicating that a single radio access technology (RAT) is used for camping, and the multiple camping mode indicating that multiple RATs are used for camping, wherein determining the target camping mode comprises:
in response to an active time period or traffic amount of the mobile terminal being obtained, comparing the active time period to a threshold time or comparing a traffic amount of the mobile terminal to a threshold amount
in response to the active time period exceeding the threshold time or the traffic amount exceeding the threshold amount, determining the multiple camping mode as the target camping mode, and
in response to the active time period being less than the threshold time or the traffic amount being less than the threshold amount, determining the single camping mode as the target camping mode, and
configure the mobile terminal based on the target camping mode.

17. A non-transitory machine-readable storage medium including instructions which, when executed on a processor of a device, cause the device to perform:
obtaining an operation state of a mobile terminal;
determining a target camping mode from a single camping mode and a multiple camping mode based on the operation state of the mobile terminal, the single camping mode indicating that a single radio access technology (RAT) is used for camping, and the multiple camping mode indicating that multiple RATs are used for camping, wherein determining the target camping mode comprises:
in response to an active time period or traffic amount of the mobile terminal being obtained, comparing the active time period to a threshold time or comparing a traffic amount of the mobile terminal to a threshold amount
in response to the active time period exceeding the threshold time or the traffic amount exceeding the threshold amount, determining the multiple camping mode as the target camping mode, and
in response to the active time period being less than the threshold time or the traffic amount being less than the threshold amount, determining the single camping mode as the target camping mode; and
configuring the mobile terminal based on the target camping mode.

18. A mobile terminal, comprising:
a processor and a non-transitory machine-readable storage medium including instructions executable by the processor, the processor being configured to cause the mobile terminal to:
receive an indication of a target camping mode, the target camping mode being determined from a single camping mode and a multiple camping mode based on an operation state of the mobile terminal, the single camping mode indicating that a single radio access technology (RAT) is used in camping, and the multiple camping mode indicating that multiple RATs are used in camping, wherein determining the target camping mode comprises:
in response to an active time period or traffic amount of the mobile terminal being obtained, comparing the active time period to a threshold time or comparing a traffic amount of the mobile terminal to a threshold amount
in response to the active time period exceeding the threshold time or the traffic amount exceeding the threshold amount, determining the multiple camping mode as the target camping mode, and
in response to the active time period being less than the threshold time or the traffic amount being less than the threshold amount, determining the single camping mode as the target camping mode; and
perform camping according to the target camping mode.

19. A non-transitory machine-readable storage medium including instructions which, when executed on a processor of a mobile terminal, cause the mobile terminal to perform:
receiving an indication of a target camping mode, the target camping mode being determined from a single camping mode and a multiple camping mode based on an operation state of the mobile terminal, the single camping mode indicating that a single radio access technology (RAT) is used in camping, and the multiple camping mode indicating that multiple RATs are used in camping, wherein determining the target camping mode comprises:
in response to an active time period or traffic amount of the mobile terminal being obtained, comparing the active time period to a threshold time or comparing a traffic amount of the mobile terminal to a threshold amount
in response to the active time period exceeding the threshold time or the traffic amount exceeding the threshold amount, determining the multiple camping mode as the target camping mode, and
in response to the active time period being less than the threshold time or the traffic amount being less than the threshold amount, determining the single camping mode as the target camping mode; and
performing camping according to the target camping mode.

* * * * *